(12) United States Patent
Sinha et al.

(10) Patent No.: US 11,429,142 B2
(45) Date of Patent: Aug. 30, 2022

(54) GLITCH DETECTOR

(71) Applicant: NXP USA, Inc., Austin, TX (US)

(72) Inventors: Rohit Kumar Sinha, Noida (IN); Garima Sharda, Beecave, TX (US); Vandana Sapra, Delhi (IN); Amol Agarwal, Noida (IN); Stefan Doll, Munich (DE); Andreas Lentz, Buchholz (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/247,651

(22) Filed: Dec. 18, 2020

(65) Prior Publication Data

US 2022/0197332 A1    Jun. 23, 2022

(51) Int. Cl.
*G06F 1/14* (2006.01)

(52) U.S. Cl.
CPC ...................... *G06F 1/14* (2013.01)

(58) Field of Classification Search
CPC ...................... G06F 1/12; G06F 1/10
See application file for complete search history.

(56) References Cited

U.S. PATENT DOCUMENTS

| | | | |
|---|---|---|---|
| 5,604,452 A * | 2/1997 | Huang | G06F 1/08 326/46 |
| 6,452,426 B1 * | 9/2002 | Tamarapalli | G06F 1/08 327/199 |
| 7,671,633 B2 * | 3/2010 | Kuhn | G06F 1/08 326/94 |
| 9,024,663 B2 | 5/2015 | Rohleder et al. | |
| 9,413,346 B2 | 8/2016 | Kumar | |
| 9,720,438 B2 * | 8/2017 | Lee | G06F 1/10 |
| 2002/0135408 A1 * | 9/2002 | Chiu | H03K 5/1252 375/373 |
| 2005/0040855 A1 * | 2/2005 | Boerstler | H03K 17/005 326/93 |

(Continued)

FOREIGN PATENT DOCUMENTS

EP    1 777 535 A2    4/2007

OTHER PUBLICATIONS

Luo, P. et al. "Faulty Clock Detection for Crypto Circuits Against Differential Fault Analysis Attack", Computer Science IACR Cryptol, ePrint Arch., Dept. of Electrical and Computer Engineering, NorthEastern Uni., Boston, 7 pgs., retrieved from the internet at: https://eprint.iacr.org/2014/883.pdf (2014).

*Primary Examiner* — Phil K Nguyen

(57) ABSTRACT

A glitch detector includes a metastability detector circuit, a reference storage circuit, and a pattern comparison circuit. The metastability detector circuit is configured to generate state signals at each cycle of the clock signal. The reference storage circuit is configured to store a logic state of each state signal based on a delayed version of the clock signal, and generate reference signals. A logic state of each reference signal is equal to a logic state of a corresponding state signal generated during a previous cycle of the clock signal. The pattern comparison circuit is configured to receive the state signals generated during a current cycle of the clock signal, the reference signals, and first and second values, and generate clock and voltage glitch signals based on first and second patterns that are associated with the state signals generated during the current cycle and the reference signals, respectively.

10 Claims, 7 Drawing Sheets

(56) References Cited

U.S. PATENT DOCUMENTS

| | | | |
|---|---|---|---|
| 2005/0270073 A1* | 12/2005 | Lee | G06F 1/08 |
| | | | 327/99 |
| 2009/0121744 A1* | 5/2009 | Kuhn | G06F 1/08 |
| | | | 326/93 |
| 2013/0314134 A1* | 11/2013 | Kulmala | G06F 13/24 |
| | | | 327/155 |
| 2019/0004991 A1* | 1/2019 | Foust | G06F 13/364 |
| 2019/0356313 A1* | 11/2019 | Venugopal | H03K 3/0375 |
| 2020/0402929 A1 | 12/2020 | Lentz et al. | |

* cited by examiner

GLITCH DETECTOR

BACKGROUND

The present disclosure relates generally to electronic circuits, and, more particularly, to a glitch detector.

Glitch attacks are well known methods for introducing faults in a system-on-chip (SoC). A glitch attack may correspond to at least one of a clock glitch attack or a voltage glitch attack. The clock or voltage glitch attack may result in corruption of secure information or in an unsecure behavior of the SoC. To detect such glitch attacks and trigger corresponding reactions in the SoC, glitch detectors are implemented in the SoC.

A conventional clock glitch detector monitors a clock signal such as a first clock signal based on another clock signal such as a second clock signal that acts as a reference to detect a clock glitch attack introduced in the first clock signal. However, if the second clock signal is corrupted, the conventional clock glitch detector fails to detect the clock glitch attack on the first clock signal. The conventional clock glitch detector is further unable to detect the clock glitch attack due to process variations associated with the SoC that cause a change in frequency of both the first and second clock signals.

A conventional voltage glitch detector detects a voltage glitch attack by monitoring an operating voltage associated with the conventional voltage glitch detector. To detect the voltage glitch attack, the conventional voltage glitch detector requires a trim value of each delay element of the conventional voltage glitch detector from a non-volatile memory on a start-up of the SoC. Thus, additional time is required by the conventional voltage glitch detector to initiate the detection of the voltage glitch attack. Further, the conventional voltage glitch detector is not capable of detecting a clock glitch attack and the conventional clock glitch detector is not capable of detecting a voltage glitch attack. Thus, there is a need for a glitch detector that solves the aforementioned problems of the conventional clock and voltage glitch detectors.

SUMMARY

In one embodiment, a glitch detector is disclosed. The glitch detector comprises a metastability detector circuit, a reference storage circuit, and a pattern comparison circuit. The metastability detector circuit is configured to receive a clock signal and generate a plurality of state signals at each cycle of the clock signal. The reference storage circuit is coupled with the metastability detector circuit, and configured to receive the plurality of state signals and a first delayed clock signal, store a logic state of each state signal of the plurality of state signals based on the first delayed clock signal, and generate a plurality of reference signals. A logic state of each reference signal of the plurality of reference signals is equal to a logic state of a corresponding state signal of the plurality of state signals generated during a previous cycle of the clock signal. The pattern comparison circuit is coupled with the metastability detector circuit and the reference storage circuit, and configured to receive the plurality of state signals generated during a current cycle of the clock signal, the plurality of reference signals, a first value associated with a frequency of the clock signal, and a second value associated with an operating voltage of the glitch detector, and generate a clock glitch signal and a voltage glitch signal based on first and second patterns. The first pattern is associated with the plurality of state signals generated during the current cycle of the clock signal, and the second pattern is associated with the plurality of reference signals.

In another embodiment, a system-on-chip (SoC) is disclosed. The SoC comprises first and second glitch detectors and a first delay element. The first glitch detector is configured to receive a clock signal, a first value associated with a frequency of the clock signal, and a second value associated with an operating voltage of the SoC, and generate a first glitch output signal to detect one of a clock glitch and a voltage glitch in the SoC. The second glitch detector is configured to receive a first delayed clock signal, the first value, and the second value, and generate a second glitch output signal to detect one of the clock glitch and the voltage glitch in the SoC. The first delay element is coupled with the second glitch detector, and configured to receive the clock signal and delay the clock signal by a first delay value to generate the first delayed clock signal such that the second glitch detector and the first glitch detector simultaneously detect at least one of the clock glitch and the voltage glitch. The first delay value corresponds to at least one cycle of the clock signal.

In some embodiments, the glitch detector further comprises a first delay element that is configured to receive the clock signal and delay the clock signal by a first delay value to generate the first delayed clock signal. The first delay value is determined based on a time duration associated with the generation of the plurality of state signals and a time duration associated with the generation of the clock glitch signal and the voltage glitch signal.

In some embodiments, the glitch detector further comprises a first logic gate that is coupled with the first delay element, and configured to receive the first delayed clock signal and one of a first logic signal and a glitch output signal, and output the first delayed clock signal based on one of the first logic signal and the glitch output signal. The glitch output signal is generated based on the clock glitch signal and the voltage glitch signal.

In some embodiments, the glitch detector further comprises a counter and a second logic gate. The counter is configured to receive the clock signal, count a number of cycles of the clock signal, and generate a count signal based on the number of cycles of the clock signal. The second logic gate is coupled with the counter, the pattern comparison circuit, and the first logic gate, and configured to receive the count signal and the glitch output signal, and generate and provide the first logic signal to the first logic gate.

In some embodiments, the reference storage circuit comprises a first plurality of flip-flops that are coupled with the metastability detector circuit and the pattern comparison circuit. Each flip-flop of the first plurality of flip-flops is configured to receive a corresponding state signal of the plurality of state signals and the first delayed clock signal, store a logic state of the corresponding state signal based on the first delayed clock signal, and generate and provide a corresponding reference signal of the plurality of reference signals to the pattern comparison circuit.

In some embodiments, the metastability detector circuit comprises a plurality of metastability detectors. Each state signal of the plurality of state signals indicates a metastable state of a corresponding metastability detector of the plurality of metastability detectors. Each metastability detector of the plurality of metastability detectors comprises a second delay element, a third logic gate, a second plurality of flip-flops, and a fourth logic gate. The second delay element is configured to receive an input signal and delay the input signal by a second delay value to generate a second delayed clock signal. The input signal is one of the clock signal and an output signal generated by a corresponding delay element of a previous metastability detector of the plurality of metastability detectors. The second delay value is determined based on a duration of a half cycle of the clock signal. The third logic gate is configured to receive the clock signal and generate an inverted clock signal. The second plurality of flip-flops include first and second flip-flops. The first flip-flop is coupled with the second delay element and the third logic gate, and configured to receive the second delayed clock signal and the inverted clock signal, and generate a first flop-output signal. The second flip-flop is coupled with the second delay element, and configured to receive the second delayed clock signal and the clock signal, and generate a second flop-output signal. The fourth logic gate is coupled with the first and second flip-flops, and configured to receive the first and second flop-output signals, and generate a corresponding state signal of the plurality of state signals.

In some embodiments, the first pattern is indicative of the metastable state of each metastability detector of the plurality of metastability detectors during the current cycle of the clock signal, and the second pattern is indicative of the metastable state of each metastability detector of the plurality of metastability detectors during the previous cycle of the clock signal.

In some embodiments, the pattern comparison circuit comprises first and second pattern detectors. The first pattern detector is coupled with the reference storage circuit, and configured to receive the plurality of reference signals, and generate a first plurality of pattern signals based on the second pattern. The second pattern detector is coupled with the metastability detector circuit, and configured to receive the plurality of state signals generated during the current cycle of the clock signal, and generate a second plurality of pattern signals based on the first pattern.

In some embodiments, the pattern comparison circuit further comprises first through fourth processing circuits and first and second comparators. The first processing circuit is coupled with the first pattern detector, and configured to receive the first plurality of pattern signals and the first value, and generate a first processed signal. The first value is a first predetermined value that indicates a frequency range associated with the clock signal. The second processing circuit is coupled with the first and second pattern detectors, and configured to receive a first pattern signal of the first plurality of pattern signals and a second pattern signal of the second plurality of pattern signals, and generate a second processed signal. The third processing circuit is coupled with the first pattern detector, and configured to receive the first plurality of pattern signals and the second value, and generate a third processed signal. The first and third processed signals are generated at least once during a reset cycle of the glitch detector. The second value is a second predetermined value that indicates a magnitude range associated with the glitch detector. The fourth processing circuit is coupled with the second pattern detector, and configured to receive the second plurality of pattern signals, and generate a fourth processed signal. The second and fourth processed signals are generated at each cycle of the clock signal. The first comparator is coupled with the first and second processing circuits, and configured to receive the first and second processed signals, and compare the first and second processed signals to generate the clock glitch signal. The clock glitch signal is indicative of one of a clock glitch and a gradual change in the frequency associated with the clock signal. The second comparator is coupled with the third and fourth processing circuits, and configured to receive the third and fourth processed signals, and compare the third and fourth processed signals to generate the voltage glitch signal. The voltage glitch signal is indicative of one of a voltage glitch and a gradual change in the operating voltage associated with the glitch detector.

In some embodiments, the pattern comparison circuit further comprises a fifth logic gate that is coupled with the first and second comparators, and configured to receive the clock glitch signal and the voltage glitch signal, and generate a glitch output signal. The glitch output signal is independent of process variations associated with the glitch detector.

Various embodiments of the present disclosure disclose a glitch detector. The glitch detector comprises a metastability detector circuit, a reference storage circuit, and a pattern comparison circuit. The metastability detector circuit is configured to receive a clock signal and generate state signals at each cycle of the clock signal. The reference storage circuit is configured to receive the plurality of state signals and a first delayed clock signal, store a logic state of each state signal based on the first delayed clock signal, and generate reference signals. A logic state of each reference signal is equal to a logic state of a corresponding state signal generated during a previous cycle of the clock signal. The pattern comparison circuit is configured to receive the state signals generated during a current cycle of the clock signal, the reference signals, a first value associated with a frequency of the clock signal, and a second value associated with an operating voltage of the glitch detector, and generate clock and voltage glitch signals based on first and second patterns, thereby detecting one of a clock glitch and a voltage glitch. The first pattern is associated with the state signals generated during the current cycle, and the second pattern is associated with the reference signals.

The glitch detector detects the clock and voltage glitches based on the first and second patterns associated with the state signals and the reference signals, respectively. As a result, a requirement of a reference clock signal for the detection of the clock glitch and a requirement of a trim value associated with each delay element of the glitch detector is eliminated. As the clock and voltage glitch signals are independent of process variations associated with the glitch detector, the glitch detector is unaffected by process variations associated with the glitch detector to detect the clock and voltage glitches. Further, two such glitch detectors are capable of detecting the clock glitch and the voltage glitch simultaneously.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
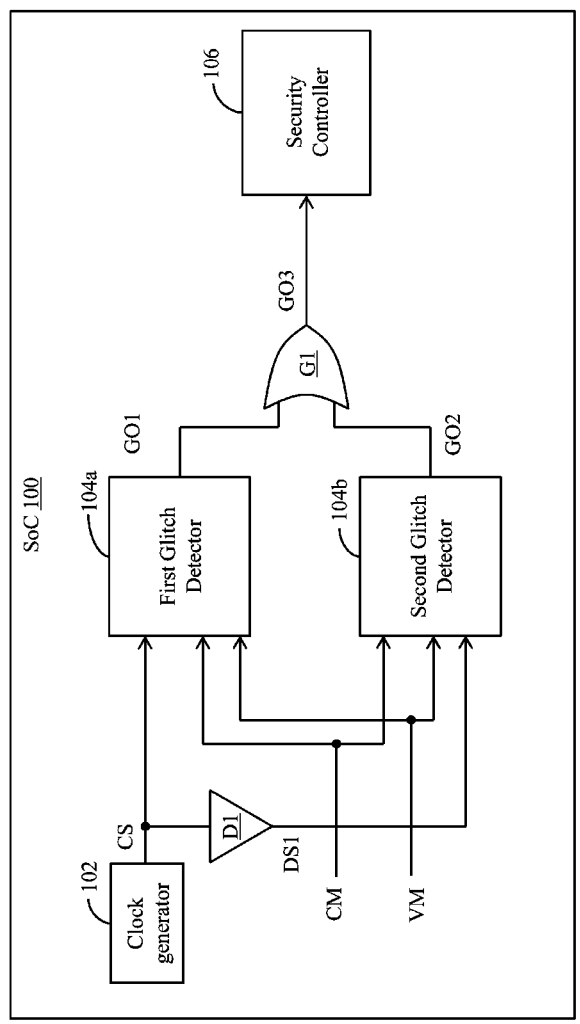
FIG. 1 is a schematic block diagram of a system-on-chip (SoC) in accordance with an embodiment of the present disclosure.

FIG. 1 is a schematic block diagram of a system-on-chip (SoC) 100 in accordance with an embodiment of the present disclosure. The SoC 100 may be utilized in security related applications that require secure on-chip or off-chip communication. The SoC 100 includes a clock generator 102, first and second glitch detectors 104a and 104b, a first delay element D1, a first logic gate G1, and a security controller 106. The SoC 100 may undergo at least one of a clock glitch attack and a voltage glitch attack. In one example, the SoC 100 may undergo the clock and voltage glitch attacks simultaneously.

The clock generator 102 is configured to generate a clock signal CS having a first frequency. The clock generator 102 is coupled with the first glitch detector 104a and the first delay element D1, and further configured to provide the clock signal CS to the first glitch detector 104a and the first delay element D1. When the SoC 100 is introduced to the clock glitch attack, the clock glitch attack causes a clock glitch (i.e., a sudden change in a frequency of the clock signal CS) or a gradual change in the frequency of the clock signal CS. When the SoC 100 is introduced to the voltage glitch attack, the voltage glitch attack causes a voltage glitch (i.e., a sudden change in a magnitude of an operating voltage associated with the SoC 100) or a gradual change in the operating voltage associated with the SoC 100. The clock generator 102 may be an oscillator.

The first glitch detector 104a is coupled with the clock generator 102, and configured to receive the clock signal CS, a first value CM associated with the frequency of the clock signal CS, and a second value VM associated with the operating voltage of the SoC 100, i.e., an operating voltage associated with the first and second glitch detectors 104a and 104b, and generate a first glitch output signal GO1 to detect one of the clock glitch and the voltage glitch in the SoC 100. The first value CM is a first predetermined value that indicates a frequency range (i.e., a margin) associated with the clock signal CS. In one example, when the frequency of the clock signal CS is not within the frequency range, the clock glitch is detected. The second value VM is a second predetermined value that indicates a magnitude range (i.e., a margin) of the operating voltage associated with the SoC 100. In one example, when the second value VM is not within the magnitude range, the voltage glitch is detected. In one embodiment, a controller (not shown) of the SoC 100 is configured to generate the first value CM and the second value VM. In another embodiment, the clock generator 102 is configured to generate the first value CM and the second value VM. The structure and working of the first glitch detector 104a are explained in detail in conjunction with FIGS. 2-5.

The second glitch detector 104b is configured to receive a delayed version of the clock signal CS (hereinafter referred to as the "first delayed clock signal DS1"), the first value CM, and the second value VM, and generate a second glitch output signal GO2 to detect one of the clock glitch and the voltage glitch in the SoC 100. The second glitch detector 104b is structurally and functionally similar to the first glitch detector 104a. The structure and working of the second glitch detector 104b are explained in detail in conjunction with FIGS. 6 and 7.

The first delay element D1 is coupled with the clock generator 102 and the second glitch detector 104b, and configured to receive the clock signal CS and delay the clock signal CS by a first delay value to generate the first delayed clock signal DS1 such that the first and second glitch detectors 104a and 104b simultaneously detect at least one of the clock glitch and the voltage glitch. In one example, the first and second glitch detectors 104a and 104b simultaneously detect the clock glitch and the voltage glitch, respectively. In another example, the first and second glitch detectors 104a and 104b simultaneously detect the voltage glitch and the clock glitch, respectively. The first delay value corresponds to at least one cycle of the clock signal CS.

The first logic gate G1 is coupled with the first and second glitch detectors 104a and 104b, and configured to receive the first and second glitch output signals GO1 and GO2 and generate a third glitch output signal GO3. In one example, the first logic gate G1 is an OR gate.

The security controller 106 is coupled with the first logic gate G1, and configured to receive the third glitch output signal GO3. The third glitch output signal GO3 is indicative of at least one of the clock glitch and the voltage glitch. The security controller 106 is further configured to reset the SoC 100 based on the third glitch output signal GO3. In one example, the security controller 106 resets the SoC 100 when the third glitch output signal GO3 is at logic high state. In one example, the security controller 106 is a reset control circuit of the SoC 100.

It will be apparent to a person skilled in the art that although in the current embodiment, the security controller 106 is coupled with the first logic gate G1, and receives the third glitch output signal GO3 and resets the SoC 100 based on the third glitch output signal GO3, the scope of the present disclosure is not limited to it. In various other embodiments, the security controller 106 is coupled with the first and second glitch detectors 104a and 104b, and configured to receive the first and second glitch output signals GO1 and GO2 directly (i.e., without the need of the first logic gate G1) and reset the SoC 100 based on at least one of the first and second glitch output signals GO1 and GO2, without deviating from the scope of the present disclosure.

Figure 2:
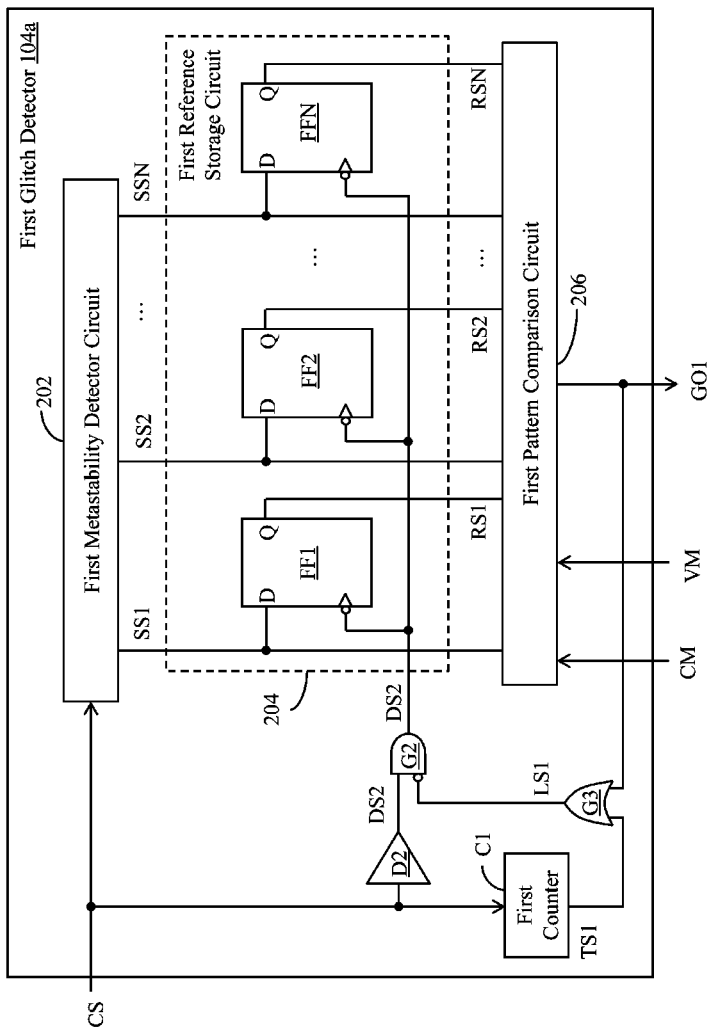
FIG. 2 is a schematic block diagram of a first glitch detector of the SoC of FIG. 1 in accordance with an embodiment of the present disclosure.

FIG. 2 is a schematic block diagram of the first glitch detector 104a in accordance with an embodiment of the present disclosure. The first glitch detector 104a includes a first metastability detector circuit 202, a first counter C1, a second delay element D2, second and third logic gates G2 and G3, a first reference storage circuit 204, and a first pattern comparison circuit 206.

The first metastability detector circuit 202 is coupled with the clock generator 102, and configured to receive the clock signal CS as a first input signal and generate a first plurality of state signals SS1, SS2, . . . , SSN at each cycle of the clock signal CS. The first plurality of state signals SS1, SS2, . . . , SSN indicate metastable states of a first plurality of metastability detectors 402a-402m (shown later in FIG. 4) of the first metastability detector circuit 202. The structure and working of the first metastability detector circuit 202 has been explained in detail in FIG. 4.

The second delay element D2 is coupled with the clock generator 102, and configured to receive the clock signal CS. The second delay element D2 is further configured to delay the clock signal CS by a second delay value to generate a second delayed clock signal DS2. The second delayed clock signal DS2 is thus a delayed version of the clock signal CS. The second delay value is determined based on a time duration associated with the generation of the first plurality of state signals SS1, SS2, . . . , SSN and a time duration associated with the generation of the first glitch output signal GO1, i.e., a generation of a first clock glitch signal GS1 (shown later in FIG. 5) and a first voltage glitch signal VS1 (shown later in FIG. 5). In one embodiment, the first and second delay values are different.

The first counter C1 is coupled with the clock generator 102, and configured to receive the clock signal CS, count a number of cycles of the clock signal CS, and generate a first count signal TS1 based on the number of cycles of the clock signal CS. The first counter C1 generates the first count signal TS1 at logic high state when the number of cycles of the clock signal CS is equal to or greater than a predetermined threshold value associated with the first counter C1. In one example, when the predetermined threshold value is '5', the first count signal TS1 is generated at logic high state after every '5' cycles of the clock signal CS.

The second logic gate G2 is coupled with the second delay element D2, and configured to receive the second delayed clock signal DS2 and a first logic signal LS1 at first and second input terminals thereof, respectively. The second input terminal of the second logic gate G2 is an inverted input terminal. The second logic gate G2 is further configured to output the second delayed clock signal DS2 based on the first logic signal LS1 at an output terminal thereof. The second logic gate G2 outputs the second delayed clock signal DS2 when the first logic signal LS1 is at logic low state. In one example, the second logic gate G2 is an AND gate having one non-inverting input terminal and one inverting input terminal.

The first reference storage circuit 204 is coupled with the first metastability detector circuit 202 and the second logic gate G2, and configured to receive the first plurality of state signals SS1, SS2, . . . , SSN and the second delayed clock signal DS2. The first reference storage circuit 204 is further configured to store a logic state of each state signal of the first plurality of state signals SS1, SS2, . . . , SSN based on the second delayed clock signal DS2, and generate a first plurality of reference signals RS1, RS2, . . . , RSN. A logic state of each reference signal of the first plurality of reference signals RS1, RS2, . . . , RSN is equal to a logic state of a corresponding state signal of the first plurality of state signals SS1, SS2, . . . , SSN generated during a previous cycle of the clock signal CS. In one example, the previous cycle of the clock signal CS corresponds to a cycle of the clock signal CS immediately before a current cycle of the clock signal CS. In another example, the previous cycle of the clock signal CS corresponds to any cycle of the clock signal CS that is not immediately before the current cycle of the clock signal CS.

The first reference storage circuit 204 includes a first plurality of flip-flops FF1, FF2, . . . , FFN of which first, second, and Nth flip-flops FF1, FF2, and FFN are shown. Each flip-flop of the first plurality of flip-flops FF1, FF2, . . . , FFN is coupled with the first metastability detector circuit 202 and the second logic gate G2, and configured to receive a corresponding state signal of the first plurality of state signals SS1, SS2, . . . , SSN and the second delayed clock signal DS2. Each flip-flop of the first plurality of flip-flops FF1, FF2, . . . , FFN is further coupled with the first pattern comparison circuit 206, and configured to store a logic state of the corresponding state signal based on the second delayed clock signal DS2, and generate and provide a corresponding reference signal of the first plurality of reference signals RS1, RS2, . . . , RSN to the first pattern comparison circuit 206.

The first flip-flop FF1 has input and inverted clock terminals that are coupled with the first metastability detector circuit 202 and the second logic gate G2, respectively. The input and inverted clock terminals of the first flip-flop FF1 are configured to receive a first state signal SS1 of the first plurality of state signals SS1, SS2, . . . , SSN and the second delayed clock signal DS2, respectively. The first flip-flop FF1 further has an output terminal that is configured to generate a first reference signal RS1 of the first plurality of reference signals RS1, RS2, . . . , RSN. The first flip-flop FF1 is further configured to store a logic state of the first state signal SS1 generated in the previous clock cycle of the clock signal CS. The first reference signal RS1 is generated based on the logic state of the first state signal SS1 generated in the previous clock cycle of the clock signal CS. Thus, a logic state of the first reference signal RS1 is equal to the logic state of the first state signal SS1 generated during the previous cycle of the clock signal CS.

The second flip-flop FF2 has input and inverted clock terminals that are coupled with the first metastability detector circuit 202 and the second logic gate G2, respectively. The input and inverted clock terminals of the second flip-flop FF2 are configured to receive a second state signal SS2 of the first plurality of state signals SS1, SS2, . . . , SSN and the second delayed clock signal DS2, respectively. The second flip-flop FF2 further has an output terminal that is configured to generate a second reference signal RS2 of the first plurality of reference signals RS1, RS2, . . . , RSN. The second flip-flop FF2 is further configured to store a logic state of the second state signal SS2 generated in the previous clock cycle of the clock signal CS. The second reference signal RS2 is generated based on the logic state of the second state signal SS2 generated in the previous clock cycle of the clock signal CS. Thus, a logic state of the second reference signal RS2 is equal to the logic state of the second state signal SS2 generated during the previous cycle of the clock signal CS.

Similarly, the Nth flip-flop FFN has input and inverted clock terminals that are coupled with the first metastability detector circuit 202 and the second logic gate G2, respectively. The input and inverted clock terminals of the Nth flip-flop FFN are configured to receive an Nth state signal SSN of the first plurality of state signals SS1, SS2, . . . , SSN and the second delayed clock signal DS2, respectively. The Nth flip-flop FFN further has an output terminal that is configured to generate an Nth reference signal RSN of the first plurality of reference signals RS1, RS2, . . . , RSN. The Nth flip-flop FFN is further configured to store a logic state of the Nth state signal SSN generated in the previous clock cycle of the clock signal CS. The Nth reference signal RSN is generated based on the logic state of the Nth state signal SSN generated in the previous clock cycle of the clock signal CS. Thus, a logic state of the Nth reference signal RSN is equal to the logic state of the Nth state signal SSN generated during the previous cycle of the clock signal CS. In one example, the first, second, and Nth flip-flops FF1, FF2, and FFN are D flip-flops.

The first pattern comparison circuit 206 is coupled with the first metastability detector circuit 202 and the first reference storage circuit 204, and configured to receive the first plurality of state signals SS1, SS2, . . . , SSN generated during the current cycle of the clock signal CS, the first plurality of reference signals RS1, RS2, . . . , RSN, the first value CM, and the second value VM. The first pattern comparison circuit 206 is further configured to generate the first clock glitch signal GS1 and the first voltage glitch signal VS1 based on first and second patterns of a first set of patterns. The first clock glitch signal GS1 is indicative of the clock glitch associated with the clock signal CS. The first voltage glitch signal VS1 is indicative of the voltage glitch associated with the SoC 100 (i.e., one of the first and second glitch detectors 104a and 104b). The first pattern comparison circuit 206 is further configured to generate the first glitch output signal GO1. The first glitch output signal GO1 is generated based on the first clock glitch signal GS1 and the first voltage glitch signal VS1. The first pattern is associated with the first plurality of state signals SS1, SS2, . . . , SSN generated during the current cycle of the clock signal CS, and the second pattern is associated with the first plurality of reference signals RS1, RS2, . . . , RSN. Further, the first pattern is indicative of the metastable states of each metastability detector of the first plurality of metastability detectors 402a-402m during the current cycle of the clock signal CS, and the second pattern is indicative of the metastable states of each metastability detector of the first plurality of metastability detectors 402a-402m during the previous cycle of the clock signal CS. The structure and working of the first pattern comparison circuit 206 has been explained in detail in FIG. 5.

The third logic gate G3 is coupled with the first counter C1, the first pattern comparison circuit 206, and the second logic gate G2, and configured to receive the first count signal TS1 and the first glitch output signal GO1, and generate and provide the first logic signal LS1 to the second logic gate G2. In one example, the third logic gate G3 is an OR gate.

Figure 3:
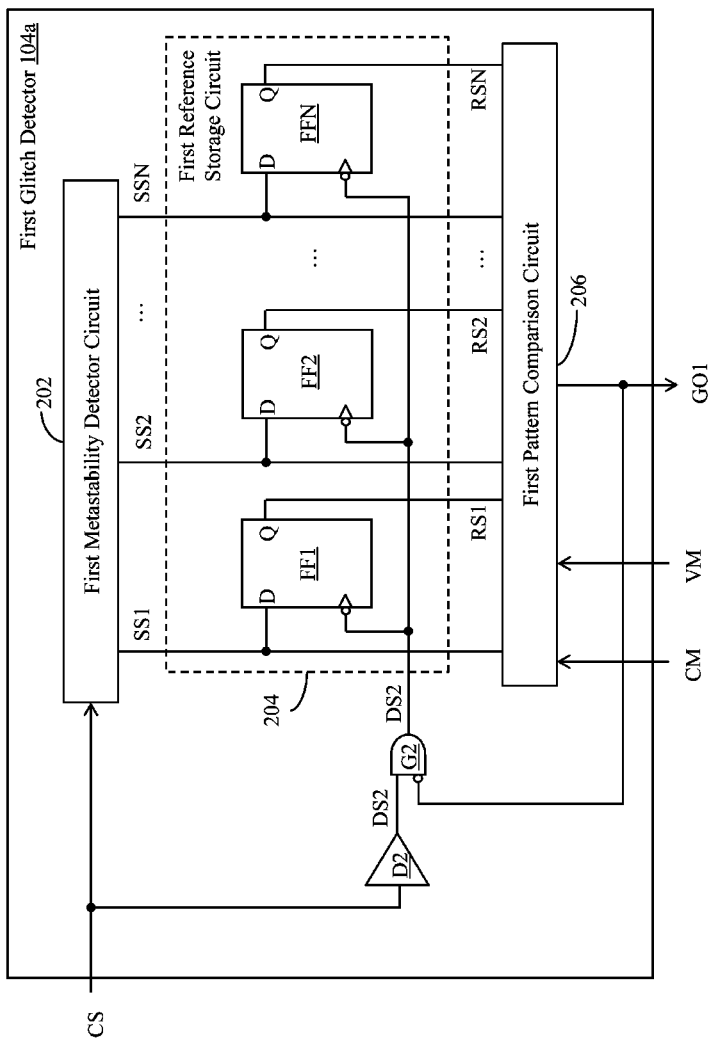
FIG. 3 is a schematic block diagram of the first glitch detector of the SoC of FIG. 1 in accordance with another embodiment of the present disclosure.

FIG. 3 is a schematic block diagram of the first glitch detector 104a in accordance with another embodiment of the present disclosure. The first glitch detector 104a includes the first metastability detector circuit 202, the second delay element D2, the second logic gate G2, the first reference storage circuit 204, and the first pattern comparison circuit 206.

The first metastability detector circuit 202 and the second delay element D2 function in a manner similar as described in FIG. 2. The second logic gate G2 is coupled with the second delay element D2, and configured to receive the second delayed clock signal DS2 and the first glitch output signal GO1 at first and second input terminals, respectively. The second input terminal is an inverted input terminal. The second logic gate G2 is further configured to output the second delayed clock signal DS2 based on the first glitch output signal GO1 at an output terminal. The second logic gate G2 outputs the second delayed clock signal DS2 when the first glitch output signal GO1 is at logic low state. The first reference storage circuit 204 and the first pattern comparison circuit 206 function in a manner similar as described in FIG. 2. The first pattern comparison circuit 206 generates the first clock glitch signal GS1 and the first voltage glitch signal VS1 based on the first and second patterns. The first clock glitch signal GS1 is indicative of one of the clock glitch and the gradual change in the frequency associated with the clock signal CS. The first voltage glitch signal VS1 is indicative of one of the voltage glitch and the gradual change in the operating voltage associated with the SoC 100.

Figure 4:
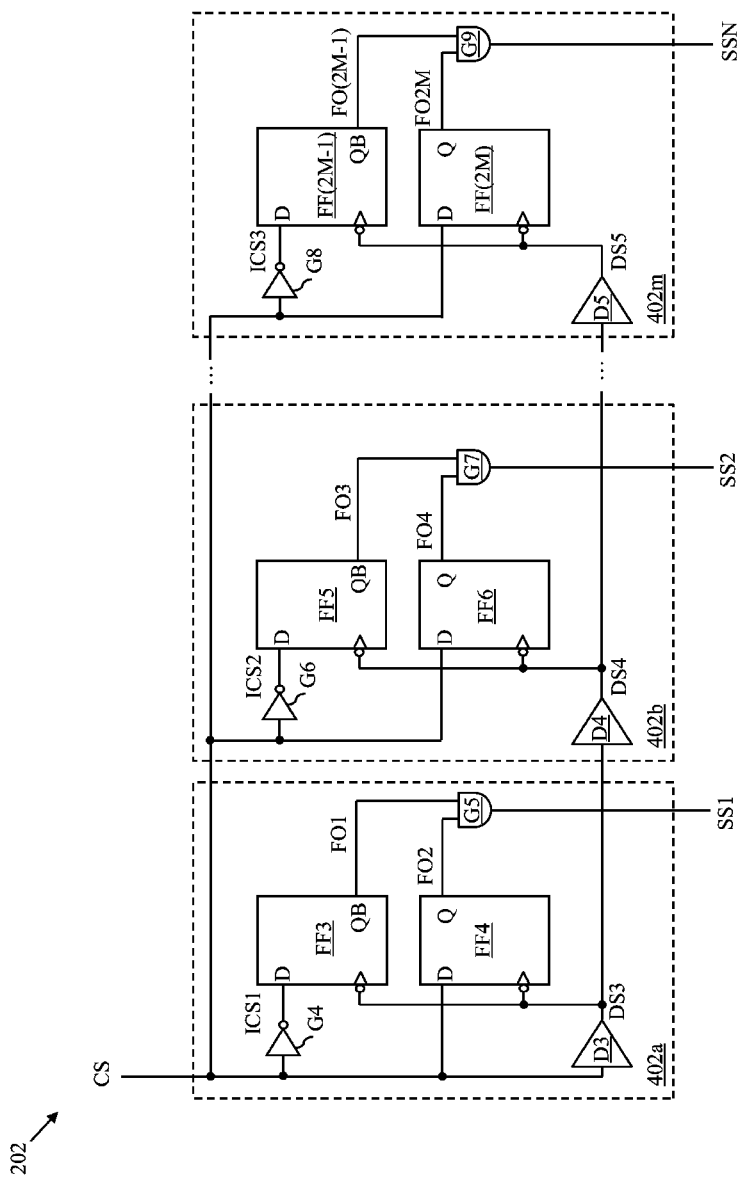
FIG. 4 is a schematic block diagram of a first metastability detector circuit of the first glitch detector of FIGS. 2 and 3 in accordance with an embodiment of the present disclosure.

FIG. 4 is a schematic block diagram of the first metastability detector circuit 202 in accordance with an embodiment of the present disclosure. The first metastability detector circuit 202 includes the first plurality of metastability detectors 402a-402m that are coupled in parallel, of which first, second, and Mth metastability detectors 402a, 402b, and 402m, are shown. Each state signal indicates a metastable state of a corresponding metastability detector of the first plurality of metastability detectors 402a-402m. In one embodiment, each metastability detector includes a delay element, a plurality of logic gates, and a plurality of flip-flops. A delay element of each metastability detector is configured to receive a second input signal and delay the second input signal by a delay value (such as a third delay value) to generate a corresponding delayed clock signal. The second input signal is one of the clock signal CS and an output signal generated by a corresponding delay element of a previous metastability detector. Further, the third delay value is determined based on a duration of a half cycle of the clock signal CS. In one embodiment, the second and third delay values are different.

It will be apparent to a person skilled in the art that each metastability detector may include 'X' number of flip-flops for detecting the metastable state, where 'X' is greater than or equal to two. In the presently preferred embodiment, 'X' is two and thus each metastability detector includes two flip-flops. It will further be apparent to a person skilled in the art that when the number of flip-flops in each metastability detector increases, a number of logic gates in the metastability detector increases proportionately.

It will be understood by those of skilled in the art that as a number of flip-flops in each metastability detector increases, an accuracy of each metastability detector to detect the metastable state increases. It will further be understood by those of skilled in the art that as a number of metastability detectors in the first metastability detector circuit 202 increases, an accuracy of the first glitch detector 104a to detect the clock and voltage glitches increases.

The first metastability detector 402a includes fourth and fifth logic gates G4 and G5, third and fourth flip-flops FF3 and FF4, and a third delay element D3. The third delay element D3 and the fourth logic gate G4 are coupled with the clock generator 102. The third delay element D3 is thus configured to receive the clock signal CS as the second input signal and delay the second input signal by the third delay value to generate a third delayed clock signal DS3. Further, the fourth logic gate G4 is configured to receive the clock signal CS. The fourth logic gate G4 further has an output terminal that is configured to generate a first inverted clock signal ICS1.

The third flip-flop FF3 is coupled with the third delay element D3 and the fourth logic gate G4, and configured to receive the third delayed clock signal DS3 at an inverted clock terminal, and the first inverted clock signal ICS1 at an input terminal, and generate a first flop-output signal FO1 at an inverted output terminal thereof.

The fourth flip-flop FF4 has input and inverted clock terminals that are coupled with the clock generator 102 and the third delay element D3, and configured to receive the clock signal CS and the third delayed clock signal DS3, respectively. The fourth flip-flop FF4 further has an output terminal that is configured to generate a second flop-output signal FO2.

The fifth logic gate G5 has first and second input terminals that are coupled with the inverted output terminal and the output terminal of the third and fourth flip-flops FF3 and FF4, respectively, and configured to receive the first and second flop-output signals FO1 and FO2, respectively. The fifth logic gate G5 further has an output terminal that is configured to generate a corresponding state signal, i.e., the first state signal SS1, of the first plurality of state signals SS1, SS2, . . . , SSN. When at least one of the third and fourth flip-flops FF3 and FF4 are in the metastable state, i.e., the first and second flop-output signals FO1 and FO2 are unable to settle into a stable '0' or '1' logic state, the first state signal SS1 is thus generated at logic low state. Further, when both the third and fourth flip-flops FF3 and FF4 are in a stable state, i.e., the first and second flop-output signals FO1 and FO2 are able to settle into a stable '0' or '1' logic state, the first state signal SS1 is thus generated at logic high state.

The second metastability detector 402b includes sixth and seventh logic gates G6 and G7, fifth and sixth flip-flops FF5 and FF6, and a fourth delay element D4. The fourth delay element D4 and the sixth logic gate G6 are coupled with the clock generator 102. The fourth delay element D4 is thus configured to receive the third delayed clock signal DS3 as the second input signal and delay the second input signal by a fourth delay value to generate a fourth delayed clock signal DS4. In one embodiment, the third and fourth delay values are same. Further, the sixth logic gate G6 is configured to receive the clock signal CS. The sixth logic gate G6 further has an output terminal that is configured to generate a second inverted clock signal ICS2.

The fifth flip-flop FF5 is coupled with the fourth delay element D4 and the sixth logic gate G6, and configured to receive the fourth delayed clock signal DS4 at an inverted clock terminal, and the second inverted clock signal ICS2 at an input terminal, and generate a third flop-output signal FO3 at an inverted output terminal thereof.

The sixth flip-flop FF6 has input and clock terminals that are coupled with the clock generator 102 and the fourth delay element D4, and configured to receive the clock signal CS and the fourth delayed clock signal DS4, respectively. The sixth flip-flop FF6 further has an output terminal that is configured to generate a fourth flop-output signal FO4.

The seventh logic gate G7 has first and second input terminals that are coupled with the inverted output terminal and the output terminal of the fifth and sixth flip-flops FF5 and FF6, respectively, and configured to receive the third and fourth flop-output signals FO3 and FO4, respectively. The seventh logic gate G7 further has an output terminal that is configured to generate a corresponding state signal, i.e., the second state signal SS2, of the first plurality of state signals SS1, SS2, . . . , SSN. When at least one of the fifth and sixth flip-flops FF5 and FF6 are in the metastable state, i.e., the third and fourth flop-output signals FO3 and FO4 are unable to settle into a stable '0' or '1' logic state, the second state signal SS2 is thus generated at the logic low state. Further, when both the fifth and sixth flip-flops FF5 and FF6 are in a stable state, i.e., the third and fourth flop-output signals FO3 and FO4 are able to settle into a stable '0' or '1' logic state, the second state signal SS2 is thus generated at the logic high state.

The Mth metastability detector 402m includes eighth and ninth logic gates G8 and G9, seventh and eighth flip-flops FF(2M−1) and FF(2M), and a fifth delay element D5. The eighth and ninth logic gates G8 and G9 are structurally and functionally similar to the fourth and fifth logic gates G4 and G5, respectively, and the seventh and eighth flip-flops FF(2M−1) and FF(2M) are structurally and functionally similar to the third flip-flop FF3. The fifth delay element D5 is coupled with the previous metastability detector, i.e., an (M−1)th metastability detector (not shown), and configured to receive and delay a corresponding delayed clock signal (not shown) of the previous metastability detector by a fifth delay value to generate a fifth delayed clock signal DS5. In one embodiment, the third through fifth delay values are same.

The eighth logic gate G8 has an input terminal that is coupled with the clock generator 102, and configured to receive the clock signal CS. The eighth logic gate G8 further has an output terminal that is configured to generate a third inverted clock signal ICS3.

The seventh and eighth flip-flops FF(2M−1) and FF(2M) have input terminals that are coupled with the output terminal of the eighth logic gate G8 and the clock generator 102, respectively, and configured to receive the third inverted clock signal ICS3 and the clock signal CS, respectively. The seventh and eighth flip-flops FF(2M−1) and FF(2M) further have inverted clock terminals that are coupled with the fifth delay element D5, and configured to receive the fifth delayed clock signal DS5. Further, the seventh and eighth flip-flops FF(2M−1) and FF(2M) have an inverted output terminal and an output terminal that are configured to generate fifth and sixth flop-output signals FO(2M−1) and FO2M, respectively.

The ninth logic gate G9 has first and second input terminals that are coupled with the inverted output terminal and the output terminal of the seventh and eighth flip-flops FF(2M−1) and FF(2M), respectively, and configured to receive the fifth and sixth flop-output signals FO(2M−1) and FO2M, respectively. The ninth logic gate G9 further has an output terminal that is configured to generate the Nth state signal SSN. Further, when at least one of the seventh and eighth flip-flops FF(2M−1) and FF(2M) are in the metastable state, the Nth state signal SSN is generated at a logic low state, and when both the seventh and eighth flip-flops FF(2M−1) and FF(2M) are in the stable state, the Nth state signal SSN is generated at a logic high state. In one example, the third through eighth flip-flops FF3, FF4, FF5, FF6, FF(2M−1), and FF(2M) are D flip-flops, the fourth, sixth, and eighth logic gates G4, G6, and G8, are NOT gates, and the fifth, seventh, and ninth logic gates G5, G7, and G9 are AND gates.

Figure 5:
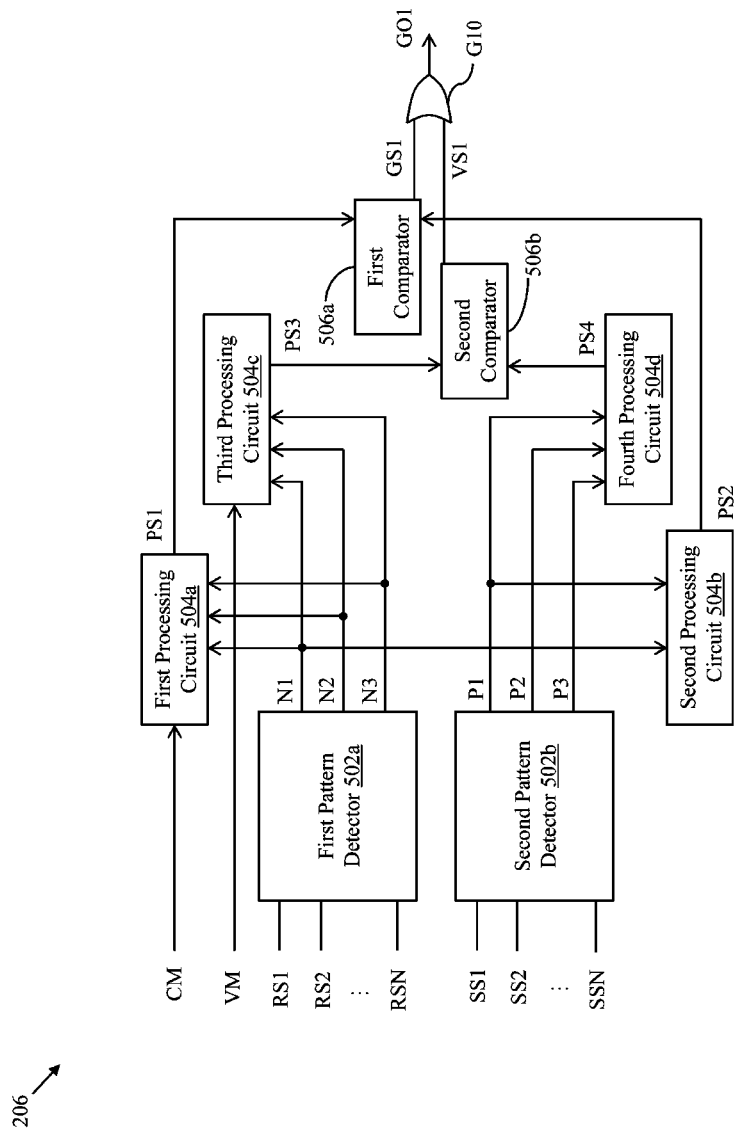
FIG. 5 is a schematic block diagram of a first pattern comparison circuit of the first glitch detector of FIGS. 2 and 3 in accordance with an embodiment of the present disclosure.

FIG. 5 is a schematic block diagram of the first pattern comparison circuit 206 in accordance with an embodiment of the present disclosure. The first pattern comparison circuit 206 includes first and second pattern detectors 502a and 502b, first through fourth processing circuits 504a-504d, first and second comparators 506a and 506b, and a tenth logic gate G10.

The first pattern detector 502a is coupled with the first reference storage circuit 204, and includes suitable circuitry that is configured to receive the first plurality of reference signals RS1, RS2, . . . , RSN, and generate a first plurality of pattern signals including first through third pattern signals N1-N3 based on the second pattern. The first pattern signal N1 is indicative of a number of metastability detectors in a stable state (i.e., not in the metastable state) during the previous cycle of the clock signal CS. The second pattern signal N2 is indicative of a number of metastability detectors in the metastable state during a setup time associated with the first plurality of metastability detectors 402a-402m in the previous cycle of the clock signal CS. The setup time corresponds to a time duration after a falling edge of the clock signal CS during which if any metastability detector of the first plurality of metastability detectors 402a-402m receives the second input signal that transitions from one logic state to another, the corresponding metastability detector goes in the metastable state. The third pattern signal N3 is indicative of a number of metastability detectors in the metastable state during a hold time associated with the first plurality of metastability detectors 402a-402m in the previous cycle of the clock signal CS. The hold time corresponds to a time duration before a rising edge of the clock signal CS during which if any metastability detector of the first plurality of metastability detectors 402a-402m receives the second input signal that transitions from one logic state to another, the corresponding metastability detector goes in the metastable state.

The second pattern detector 502b is coupled with the first metastability detector circuit 202, and includes suitable circuitry that is configured to receive the first plurality of state signals SS1, SS2, . . . , SSN generated during the current cycle of the clock signal CS, and generate a second plurality of pattern signals including fourth through sixth pattern signals P1-P3 based on the first pattern. The fourth pattern signal P1 is indicative of a number of metastability detectors that are in the stable state during the current cycle of the clock signal CS. The fifth pattern signal P2 is indicative of a number of metastability detectors that are in the metastable state during the setup time associated with the first plurality of metastability detectors 402a-402m in the current cycle of the clock signal CS. The sixth pattern signal P3 is indicative of a number of metastability detectors that are in the metastable state during the hold time associated with the first plurality of metastability detectors 402a-402m in the current cycle of the clock signal CS.

The first processing circuit 504a is coupled with the first pattern detector 502a, and includes suitable circuitry that is configured to receive the first through third pattern signals N1-N3 and the first value CM, and generate a first processed signal PS1. The first processing circuit 504a generates the first processed signal PS1 based on the equation (1) given below:

$$PS1 = V1*(N1+N2+N3) \qquad (1)$$

where,
PS1 of equation (1) represents a magnitude of the first processed signal PS1,
V1 represents the first value CM,
N1 represents the number of metastability detectors in the stable state during the previous cycle of the clock signal CS,
N2 represents the number of metastability detectors in the metastable state during the setup time in the previous cycle of the clock signal CS, and
N3 represents the number of metastability detectors in the metastable state during the hold time in the previous cycle of the clock signal CS.

The second processing circuit 504b is coupled with the first and second pattern detectors 502a and 502b, and includes suitable circuitry that is configured to receive the first pattern signal N1 and the fourth pattern signal P1, and generate a second processed signal PS2. The second processing circuit 504b generates the second processed signal PS2 based on the equation (2) given below:

$$PS2 = N1-P1 \qquad (2)$$

where,
PS2 of equation (2) represents a magnitude of the second processed signal PS2, and
P1 represents the number of metastability detectors in the stable state during the current cycle of the clock signal CS.

The third processing circuit 504c is coupled with the first pattern detector 502a, and includes suitable circuitry that is configured to receive the first through third pattern signals N1-N3 and the second value VM, and generate a third processed signal PS3. The first and third processed signals PS1 and PS3 are generated at least once during a reset cycle of the first glitch detector 104a. The reset cycle of the first glitch detector 104a corresponds to a duration between two time instances at which the first glitch detector 104a is reset. The third processing circuit 504c generates the third processed signal PS3 based on the equation (3) given below:

$$PS3 = \frac{(N1+N2+N3)}{1-V2} \qquad (3)$$

where,
PS3 of equation (3) represents a magnitude of the third processed signal PS3, and
V2 represents the second value VM.

The fourth processing circuit 504d is coupled with the second pattern detector 502b, and includes suitable circuitry that is configured to receive the fourth through sixth pattern signals P1-P3, and generate a fourth processed signal PS4. The second and fourth processed signals PS2 and PS4 are generated at each cycle of the clock signal CS. The fourth processing circuit 504d generates the fourth processed signal PS4 based on the equation (4) given below:

$$PS4=P1+P2+P3 \qquad (4)$$

where,
PS4 of equation (4) represents a magnitude of the fourth processed signal PS4,
P2 represents the number of metastability detectors in the metastable state during the setup time in the current cycle of the clock signal CS, and
P3 represents the number of metastability detectors in the metastable state during the hold time in the current cycle of the clock signal CS.

The first comparator 506a is coupled with the first and second processing circuits 504a and 504b, and configured to receive the first and second processed signals PS1 and PS2, and compare the first and second processed signals PS1 and PS2 to generate the first clock glitch signal GS1. The first clock glitch signal GS1 is indicative of one of the clock glitch and the gradual change in the frequency associated with the clock signal CS. In one example, when the magnitude of the second processed signal PS2 is greater than the magnitude of the first processed signal PS1, the first comparator 506a generates the first clock glitch signal GS1 at logic high state to indicate one of the clock glitch and the gradual change in the frequency associated with the clock signal CS.

The second comparator 506b is coupled with the third and fourth processing circuits 504c and 504d, and configured to receive the third and fourth processed signals PS3 and PS4, and compare the third and fourth processed signals PS3 and PS4 to generate the first voltage glitch signal VS1. The first voltage glitch signal VS1 is indicative of one of the voltage glitch and the gradual change in the operating voltage associated with the first glitch detector 104a. In one example, when the magnitude of the fourth processed signal PS4 is greater than the magnitude of the third processed signal PS3, the second comparator 506b generates the first voltage glitch signal VS1 at logic high state to indicate one of the voltage glitch and the gradual change in the operating voltage associated with the first glitch detector 104a.

The tenth logic gate G10 is coupled with the first and second comparators 506a and 506b, and configured to receive the first clock glitch signal GS1 and the first voltage glitch signal VS1, and generate the first glitch output signal GO1. The first glitch output signal GO1 is independent of process variations associated with the first glitch detector 104a. The tenth logic gate G10 is further coupled with the first logic gate G1, and further configured to provide the first glitch output signal GO1 to the first logic gate G1.

It will be apparent to a person skilled in the art that although in the current embodiment, the tenth logic gate G10 is coupled with the first logic gate G1, and provides the first glitch output signal GO1 to the first logic gate G1, the scope of the present disclosure is not limited to it. In various other embodiments, the first and second comparators 506a and 506b are directly coupled with the first logic gate G1, and provide the first clock glitch signal GS1 and the first voltage glitch signal VS1 to the first logic gate G1 (i.e., without the need of the tenth logic gate G10), without deviating from the scope of the present disclosure.

In operation, the clock generator 102 generates and provides the clock signal CS to the first metastability detector circuit 202 and the first delay element D1. The first metastability detector circuit 202 is thus triggered to generate the first plurality of state detection signals SS1, SS2, ..., SSN, i.e., the first plurality of metastability detectors 402a-402m are thus triggered to generate the first plurality of state detection signals SS1, SS2, ..., SSN, respectively, at each cycle of the clock signal CS. The third through eighth flip-flops FF3-FF6, FF(2M−1), and FF(2M) receive a corresponding delayed clock signal at their respective inverted clock terminals. A delay value associated with the corresponding delayed clock signal increases from the first metastability detector 402a to the Mth metastability detector 402m due to a series connection of the first plurality of metastability detectors 402a-402m. In one example, the first metastability detector circuit 202 includes four metastability detectors. During the previous cycle of the clock signal CS, the first and Mth metastability detectors 402a and 402m are in a metastable state, i.e., the first and Nth state detection signals SS1 and SSN are at the logic low state, and the remaining two metastability detectors are in a stable state, thus the remaining two state detection signals are at the logic high state. The logic states of the first plurality of state signals SS1, SS2, ..., SSN are stored in the first reference storage circuit 204.

The first reference storage circuit 204 generates the first plurality of reference signals RS1, RS2, ..., RSN such that the logic state of each reference signal of the first plurality of reference signals RS1, RS2, ..., RSN is equal to the logic state of the corresponding state signal of the first plurality of state signals SS1, SS2, ..., SSN. The first pattern detector 502a receives the first plurality of reference signals RS1, RS2, ..., RSN and detects the second pattern. Thus, the second pattern is '0110' such that values of N1, N2, and N3 are '2', '1', and '1', respectively. During the previous cycle of the clock signal CS, the SoC 100 is not introduced to the clock glitch attack or the voltage glitch attack. A representation of a half cycle of the clock signal CS before the clock glitch attack and the voltage glitch attack is given by an equation (5) below:

$$tp=ts+(N1*td)+th \qquad (5)$$

where,
tp represents a time duration of the half cycle of the clock signal CS,
ts represents the setup time,
td represents a delay value of one delay element (such as the third delay element D3), and
th represents the hold time.

The setup time and hold time before the clock or voltage glitch attack are given by equations (6) and (7) below:

$$ts = N2*td \qquad (6)$$

$$th = N3*td \qquad (7)$$

Based on the equations (5), (6), and (7), a ratio between the time duration of the half cycle of the clock signal CS and the delay value of one delay element is given by the equation (8) below:

$$\frac{tp}{td} = N1 + N2 + N3 \qquad (8)$$

During the current cycle of the clock signal CS, at least one of the voltage or clock glitch attack is introduced in the SoC 100. Thus, the second metastability detector 402b is in a stable state, i.e., the second state detection signal SS2 is at the logic high state, and the remaining three metastability detectors are in a metastable state, i.e., the remaining three state detection signals are at the logic low state. The second pattern detector 502b receives the first plurality of state signals SS1, SS2, ..., SSN generated during a current cycle of the clock signal CS and detects the first pattern. Thus, the first pattern is '0100' such that values of P1, P2, and P3 are '1', '1', and '2', respectively. A representation of the half cycle of the clock signal CS after the clock glitch attack is given by an equation (9) below:

$$k1*tp=ts+(P1*td)+th \qquad (9)$$

where,
k1 represents a clock glitch factor, and
k1*tp represents a glitched time duration of the half cycle of the clock signal CS.

The setup time and the hold time after the clock glitch attack are given by equations (10) and (11) below:

$$ts = P2*td \qquad (10)$$

$$th = P3*td \qquad (11)$$

Based on the equations (8), (9), (10), and (11), the clock glitch factor is given by equation (12) below:

$$k1 = \frac{P1 + P2 + P3}{N1 + N2 + N3} \qquad (12)$$

Simplifying equation (12), an equation (13) given below is obtained:

$$(1-k1)*(N1+N2+N3)=(N1-P1) \quad (13)$$

A condition to detect the clock glitch is given by equation (14) below:

$$(1-k1) \geq V1 \quad (14)$$

Based on the equations (13) and (14), an equation (15) given below is obtained:

$$(N1-P1) \geq V1*(N1+N2+N3) \quad (15)$$

The first processing circuit 504a generates the first processed signal PS1 based on the first value CM and a total number of metastability detectors in the stable and metastable states during the previous cycle of the clock signal CS (i.e., N1+N2+N3). The second processing circuit 504b generates the second processed signal PS2 based on a difference between the number of metastability detectors in the stable state during the previous and current cycles of the clock signal CS (i.e., N1−P1). The first comparator 506a compares the first and second processed signals PS1 and PS2 similar to the comparison shown in equation (15), to detect the clock glitch and generate the first clock glitch signal GS1 based on the detection of the clock glitch.

Similarly, a representation of the half cycle of the clock signal CS after the voltage glitch attack is given by an equation (16) below:

$$tp=(k3*ts)+(P1*k2*td)+(k4*th) \quad (16)$$

where,
k2, k3, and k4 represent voltage glitch factors, and
k2*td represents a glitched delay of one element,
k3*ts represents a glitched setup time, and
k4*th represents a glitched hold time.

The setup time and hold time after the voltage glitch attack are given by equations (17) and (18) below:

$$k3*ts = P2*k2*td \quad (17)$$

$$k4*th = P3*k2*td \quad (18)$$

Based on the equations (8), (16), (17), and (18), the voltage glitch factor is given by equation (19) below:

$$k2 = \frac{N1+N2+N3}{P1+P2+P3} \quad (19)$$

A condition to detect the voltage glitch is given by equation (20) below:

$$k2 \leq 1-VMV \quad (20)$$

Based on the equations (19) and (20), an equation (21) given below is obtained:

$$(P1+P2+P3) \geq \frac{(N1+N2+N3)}{1-VMV} \quad (21)$$

The third processing circuit 504c generates the third processed signal PS3 based on a total number of metastability detectors in the stable and metastable states during the current cycle of the clock signal CS (i.e., P1+P2+P3). The fourth processing circuit 504d generates the fourth processed signal PS4 based on the second value VM and the total number of metastability detectors in the stable and metastable states during the previous cycle of the clock signal CS (i.e., N1+N2+N3). The second comparator 506b compares the third and fourth processed signals PS3 and PS4 similar to the comparison shown in equation (21), to detect the voltage glitch and generate the first voltage glitch signal VS1 based on the detection of the voltage glitch.

Figure 6:
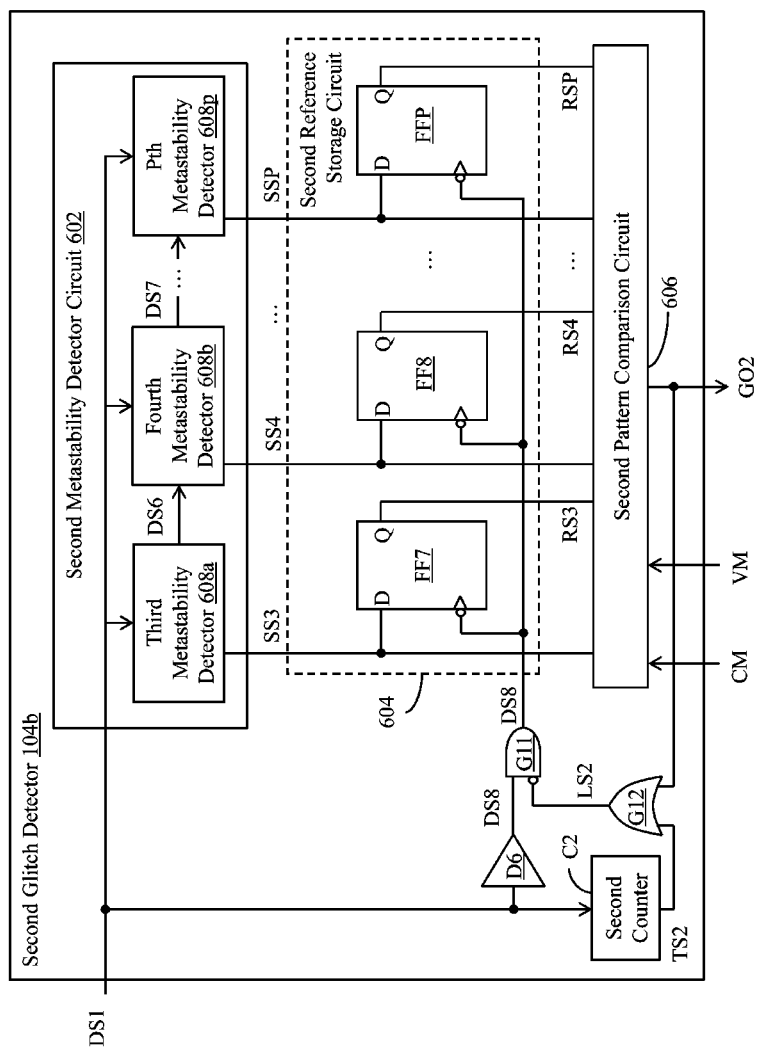
FIG. 6 is a schematic block diagram of a second glitch detector of the SoC of FIG. 1 in accordance with an embodiment of the present disclosure.

FIG. 6 is a schematic block diagram of the second glitch detector 104b in accordance with an embodiment of the present disclosure. The second glitch detector 104b includes a second metastability detector circuit 602, a second counter C2, a sixth delay element D6, eleventh and twelfth logic gates G11 and G12, a second reference storage circuit 604, and a second pattern comparison circuit 606.

The second metastability detector circuit 602 is coupled with the first delay element D1, and configured to receive the first delayed clock signal DS1 as the first input signal and generate a second plurality of state signals SS3, SS4, . . . , SSP, at each cycle of the first delayed clock signal DS1. The second metastability detector circuit 602 includes a second plurality of metastability detectors 608a-608p that are coupled in parallel, of which third, fourth, and Pth metastability detectors 608a, 608b, and 608p, are shown. The second plurality of state signals SS3, SS4, . . . , SSP indicate metastable states of a corresponding metastability detector of the second plurality of metastability detectors 608a-608p. The second plurality of metastability detectors 608a-608p are structurally and functionally similar to the first plurality of metastability detectors 402a-402m as described in in FIG. 4.

Each metastability detector of the second plurality of metastability detectors 608a-608p is configured to receive the first delayed clock signal DS1 as the first input signal, and a second input signal. The second input signal is one of the first input signal (i.e., the first delayed clock signal DS1) and an output signal generated by a previous metastability detector. Each metastability detector of the second plurality of metastability detectors 608a-608p is further configured to delay the second input signal by a delay value (such as a sixth delay value) to generate a corresponding delayed clock signal, and generate a corresponding state signal of the second plurality of state signals SS3, SS4, . . . , SSP based on the first and second input signals. The sixth delay value is determined based on a duration of the half cycle of the clock signal CS.

The third metastability detector 608a is configured to receive the first delayed clock signal DS1 as the first input signal and the second input signal. The third metastability detector 608a is further configured to delay the second input signal (i.e., the first delayed clock signal DS1) by the sixth delay value to generate a sixth delayed clock signal DS6, and generate a third state signal SS3 of the second plurality of state signals SS3, SS4, . . . , SSP based on the first delayed clock signal DS1 and the sixth delayed clock signal DS6. The fourth metastability detector 608b is configured to receive the first delayed clock signal DS1 as the first input signal and the sixth delayed clock signal DS6 as the second input signal. The fourth metastability detector 608b is further configured to delay the sixth delayed clock signal DS6 by a seventh delay value to generate a seventh delayed clock signal DS7, and generate a fourth state signal SS4 of the second plurality of state signals SS3, SS4, . . . , SSP based on the first delayed clock signal DS1 and the seventh delayed clock signal DS7. Similarly, the Pth metastability detector 608p is configured to receive the first delayed clock signal DS1 as the first input signal and an output of a (P−1)th metastability detector (not shown) as the second input signal. The Pth metastability detector 608p is further configured to delay the second input signal by an eighth delay value to generate an eighth delayed clock signal (not shown), and generate a Pth state signal SSP of the second plurality of state signals SS3, SS4, . . . , SSP based on the first delayed clock signal DS1 and the eighth delayed clock signal. The seventh and eighth delay values are equal to the seventh delay value.

The sixth delay element D6 is coupled with the first delay element D1, and configured to receive the first delayed clock signal DS1. The sixth delay element D6 is further configured to delay the first delayed clock signal DS1 by a ninth delay value to generate the ninth delayed clock signal DS8. The ninth delayed clock signal DS8 is thus a delayed version of the first delayed clock signal DS1. The ninth delay value is determined based on a time duration associated with the generation of the second plurality of state signals SS3, SS4, . . . , SSP and a time duration associated with the generation of the second glitch output signal GO2.

The second counter C2 is coupled with the first delay element D1, and configured to receive the first delayed clock signal DS1, count a number of cycles of the first delayed clock signal DS1, and generate a second count signal TS2 based on the number of cycles of the first delayed clock signal DS1 in a manner similar to the generation of the first count signal TS1 by the first counter C1 as described in FIG. 2.

The eleventh logic gate G11 is coupled with the sixth delay element D6, and configured to receive the ninth delayed clock signal DS8 and a second logic signal LS2 at first and second input terminals, respectively. The second input terminal of the eleventh logic gate G11 is an inverted input terminal. The eleventh logic gate G11 is further configured to output the ninth delayed clock signal DS8 based on the second logic signal LS2 at an output terminal. The eleventh logic gate G11 outputs the ninth delayed clock signal DS8 when the second logic signal LS2 is at logic low state. In one example, the eleventh logic gate G11 is an AND gate having one non-inverting input terminal and one inverting input terminal.

The second reference storage circuit 604 is coupled with the second metastability detector circuit 602 and the eleventh logic gate G11, and configured to receive the second plurality of state signals SS3, SS4, . . . , SSP and the ninth delayed clock signal DS8. The second reference storage circuit 604 is further configured to store a logic state of each state signal of the second plurality of state signals SS3, SS4, . . . , SSP based on the ninth delayed clock signal DS8, and generate a second plurality of reference signals RS3, RS4, . . . , RSP. A logic state of each reference signal of the second plurality of reference signals RS3, RS4, . . . , RSP is equal to a logic state of a corresponding state signal of the second plurality of state signals SS3, SS4, . . . , SSP generated during a previous cycle of the first delayed clock signal DS1. In one example, the previous cycle of the first delayed clock signal DS1 corresponds to a cycle of the first delayed clock signal DS1 immediately before a current cycle of the first delayed clock signal DS1. In another example, the previous cycle of the first delayed clock signal DS1 corresponds to any cycle of the first delayed clock signal DS1 before the current cycle of the first delayed clock signal DS1.

The second reference storage circuit 604 includes a third plurality of flip-flops FF7, FF8, . . . , FFP of which ninth, tenth, and Pth flip-flops FF7, FF8, and FFP are shown. Each flip-flop of the third plurality of flip-flops FF7, FF8, . . . , FFP is coupled with the second metastability detector circuit 602 and the eleventh logic gate G11, and configured to receive a corresponding state signal of the second plurality of state signals SS3, SS4, . . . , SSP and the ninth delayed clock signal DS8. Each flip-flop of the third plurality of flip-flops FF7, FF8, . . . , FFP is further configured to store a logic state of the corresponding state signal based on the ninth delayed clock signal DS8, and generate and provide a corresponding reference signal of the second plurality of reference signals RS3, RS4, . . . , RSP to the second pattern comparison circuit 606. The ninth, tenth, and Pth flip-flops FF7, FF8, and FFP are structurally and functionally similar to the first, second and Nth flip-flops FF1, FF2, and FFN as described in FIG. 2.

The second pattern comparison circuit 606 is coupled with the second metastability detector circuit 602 and the second reference storage circuit 604, and configured to receive the second plurality of state signals SS3, SS4, . . . , SSP generated during a current cycle of the first delayed clock signal DS1, the second plurality of reference signals RS3, RS4, . . . , RSP, the first value CM, and the second value VM. The second pattern comparison circuit 606 is further configured to generate a second clock glitch signal GS2 (shown later in FIG. 6) and a second voltage glitch signal VS2 (shown later in FIG. 6) based on third and fourth patterns of a second set of patterns. The second clock glitch signal GS2 is indicative of the clock glitch associated with the clock signal CS. The second voltage glitch signal VS2 is indicative of the voltage glitch associated with the SoC 100 (i.e., one of the first and second glitch detectors 104a and 104b). The second pattern comparison circuit 606 is further configured to generate the second glitch output signal GO2. The second glitch output signal GO2 is generated based on the second clock glitch signal GS2 and the second voltage glitch signal VS2. The third pattern is associated with the second plurality of state signals SS3, SS4, . . . , SSP generated during the current cycle of the first delayed clock signal DS1, and the fourth pattern is associated with the second plurality of reference signals RS3, RS4, . . . , RSP. Further, the third pattern is indicative of the metastable states of each metastability detector of the second plurality of metastability detectors 608a-608p during the current cycle of the first delayed clock signal DS1, and the fourth pattern is indicative of the metastable states of each metastability detector of the second plurality of metastability detectors 608a-608p during the previous cycle of the first delayed clock signal DS1. The second pattern comparison circuit 606 is structurally and functionally similar to the first pattern comparison circuit 206 as described in FIG. 5.

The twelfth logic gate G12 is coupled with the second counter C2, the second pattern comparison circuit 606, and the eleventh logic gate G11, and configured to receive the second count signal TS2 and the second glitch output signal GO2, and generate and provide the second logic signal LS2 to the eleventh logic gate G11. In one example, the twelfth logic gate G12 is an OR gate.

Figure 7:
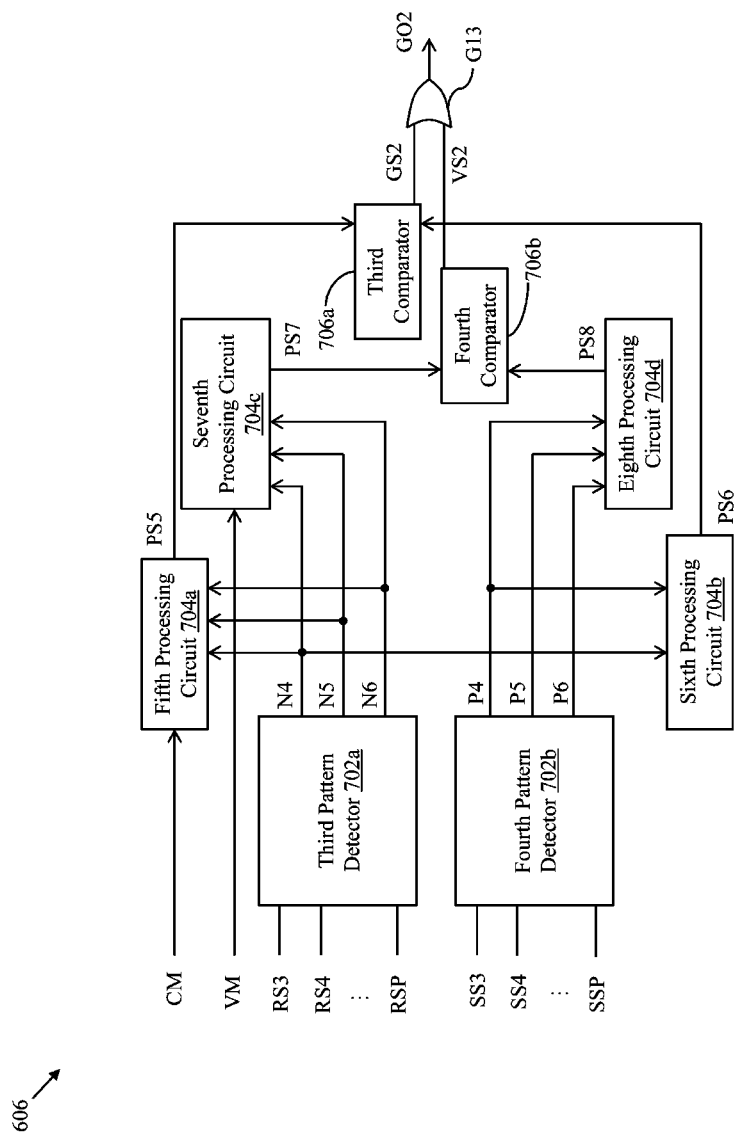
FIG. 7 is a schematic block diagram of a second pattern comparison circuit of the second glitch detector of FIG. 6 in accordance with an embodiment of the present disclosure.

FIG. 7 is a schematic block diagram of the second pattern comparison circuit 606 in accordance with an embodiment of the present disclosure. The second pattern comparison circuit 606 is structurally and functionally similar to the first pattern comparison circuit 206, and includes third and fourth pattern detectors 702a and 702b, fifth through eighth processing circuits 704a-704d, third and fourth comparators 706a and 706b, and a thirteenth logic gate G13.

The third and fourth pattern detectors 702a and 702b are structurally and functionally similar to the first and second pattern detectors 502a and 502b, respectively. The third pattern detector 702a is coupled with the second reference storage circuit 604, and includes suitable circuitry that is configured to receive the second plurality of reference signals RS3, RS4, . . . , RSP, and generate a third plurality of pattern signals including seventh through ninth pattern signals N4-N6 based on the fourth pattern. The fourth pattern detector 702b is coupled with the second metastability detector circuit 602, and includes suitable circuitry that is configured to receive the second plurality of state signals SS3, SS4, . . . , SSP generated during the current cycle of the first delayed clock signal DS1, and generate a fourth plurality of pattern signals including tenth through twelfth pattern signals P4-P6 based on the third pattern.

The fifth through eighth processing circuits 704a-704d are structurally and functionally similar to the first through fourth processing circuits 504a-504d, respectively. The fifth processing circuit 704a is coupled with the third pattern detector 702a, and includes suitable circuitry that is configured to receive the seventh through ninth pattern signals N4-N6 and the first value CM, and generate a fifth processed signal PS5. The sixth processing circuit 704b is coupled with the third and fourth pattern detectors 702a and 702b, and includes suitable circuitry that is configured to receive the seventh pattern signal N4 and the tenth pattern signal P4, and generate a sixth processed signal PS6. The seventh processing circuit 704c is coupled with the third pattern detector 702a, and includes suitable circuitry that is configured to receive the seventh through ninth pattern signals N4-N6 and the second value VM, and generate a seventh processed signal PS7. The fifth and seventh processed signals PS5 and PS7 are generated at least once during a reset cycle of the second glitch detector 104b. The reset cycle of the second glitch detector 104b corresponds to a duration between two time instances at which the second glitch detector 104b is reset. The eighth processing circuit 704d is coupled with the fourth pattern detector 702b, and includes suitable circuitry that is configured to receive the tenth through twelfth pattern signals P4-P6, and generate an eighth processed signal PS8. The sixth and eighth processed signals PS6 and PS8 are generated at each cycle of the clock signal CS.

The third comparator 706a is coupled with the fifth and sixth processing circuits 704a and 704b, and configured to receive the fifth and sixth processed signals PS5 and PS6, and compare the fifth and sixth processed signals PS5 and PS6 to generate the second clock glitch signal GS2. The second clock glitch signal GS2 is indicative of one of the clock glitch and the gradual change in the frequency associated with the clock signal CS. The fourth comparator 706b is coupled with the seventh and eighth processing circuits 704c and 704d, and configured to receive the seventh and eighth processed signals PS7 and PS8, and compare the seventh and eighth processed signals PS7 and PS8 to generate the second voltage glitch signal VS2. The second voltage glitch signal VS2 is indicative of one of the voltage glitch and the gradual change in the operating voltage associated with the second glitch detector 104b.

The thirteenth logic gate G13 is coupled with the third and fourth comparators 706a and 706b, and configured to receive the second clock glitch signal GS2 and the second voltage glitch signal VS2, and generate the second glitch output signal GO2. The second glitch output signal GO2 is independent of process variations associated with the second glitch detector 104b. The second glitch detector 104b functions in a manner similar to the first glitch detector 104a and detects one of the clock and voltage glitches based on the first delayed clock signal DS1. The thirteenth logic gate G13 is further coupled with the first logic gate G1, and further configured to provide the second glitch output signal GO2 to the first logic gate G1.

It will be apparent to a person skilled in the art that although in the current embodiment, the thirteenth logic gate G13 is coupled with the first logic gate G1, and provides the second glitch output signal GO2 to the first logic gate G1, the scope of the present disclosure is not limited to it. In various other embodiments, the third and fourth comparators 706a and 706b are directly coupled with the first logic gate G1, and provide the second clock glitch signal GS2 and the second voltage glitch signal VS2 to the first logic gate G1 (i.e., without the need of the thirteenth logic gate G13), without deviating from the scope of the present disclosure.

It will be further apparent to a person skilled in the art that although in the current embodiment, the security controller 106 is coupled with the first through fourth comparators 506a, 506b, 706a, and 706b by way of the first, tenth, and thirteenth logic gates G1, G10, and G13, and receives the third glitch output signal GO3 and resets the SoC 100 based on the third glitch output signal GO3, the scope of the present disclosure is not limited to it. In various other embodiments, the security controller 106 is directly coupled with the first through fourth comparators 506a, 506b, 706a, and 706b (i.e., without the need of the first, tenth, and thirteenth logic gates G1, G10, and G13), and receives the first and second clock glitch signals GS1 and GS2 and the first and second voltage glitch signals VS1 and VS2, and resets the SoC 100 based on at least one of the first and second clock glitch signals GS1 and GS2 and the first and second voltage glitch signals VS1 and VS2, without deviating from the scope of the present disclosure.

In a scenario, the clock and voltage glitch attacks are introduced in the SoC 100 at the same time instance, such as a first time instance t1. In such a scenario, the clock and voltage glitches are introduced in the clock signal CS at the first time instance t1, and the clock and voltage glitches are introduced in the first delayed clock signal DS1 at a second time instance t2 and the first time instance t1, respectively, due to delaying of the clock signal CS by the first delay element D1. Thus, the first glitch detector 104a receives the clock signal CS and is able to detect the clock glitch at the first time instance t1, and the second glitch detector 104b receives the first delayed clock signal DS1 and is able to detect the voltage glitch at the first time instance t1. As a result, the first and second glitch detectors 104a and 104b are able to simultaneously detect the clock and voltage glitches, respectively. Further, the first and second glitch detectors 104a and 104b are able to simultaneously detect the voltage and clock glitches, respectively, in a similar manner.

The first and second glitch detectors 104a and 104b detect the clock and voltage glitches based on the first and second patterns associated with the first plurality of state signals SS1, SS2, . . . , SSN and the first plurality of reference signals RS1, RS2, . . . , RSN, respectively. As a result, a requirement of a reference clock signal for the detection of the clock glitch and a requirement of a trim value associated with each delay element of the first and second glitch detectors 104a and 104b is eliminated. Thus, a time required by the first and second glitch detectors 104a and 104b to initiate the detection of the clock and voltage glitch attacks is significantly reduced as compared to the conventional voltage glitch detector. As the first and second glitch output signals GO1 and GO2 are independent of process variations associated with the first and second glitch detectors 104a and 104b, the first and second glitch detectors 104a and 104b remain unaffected by process variations to detect the clock and voltage glitches. Further, the first and second glitch detectors 104a and 104b are capable of simultaneously detecting at least one of the clock glitch and the voltage glitch.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A glitch detector, comprising:
a metastability detector circuit that is configured to receive a clock signal and generate a plurality of state signals at each cycle of the clock signal;
a reference storage circuit that is coupled with the metastability detector circuit, and configured to receive the plurality of state signals and a first delayed clock signal, store a logic state of each state signal of the plurality of state signals based on the first delayed clock signal, and generate a plurality of reference signals, wherein a logic state of each reference signal of the plurality of reference signals is equal to a logic state of a corresponding state signal of the plurality of state signals generated during a previous cycle of the clock signal; and
a pattern comparison circuit that is coupled with the metastability detector circuit and the reference storage circuit, and configured to receive the plurality of state signals generated during a current cycle of the clock signal, the plurality of reference signals, a first value that is associated with a frequency of the clock signal, and a second value that is associated with an operating voltage of the glitch detector, and generate a clock glitch signal and a voltage glitch signal based on first and second patterns, wherein the first pattern is associated with the plurality of state signals generated during the current cycle of the clock signal, and the second pattern is associated with the plurality of reference signals.

2. The glitch detector of claim 1, further comprising a first delay element that is configured to receive the clock signal and delay the clock signal by a first delay value to generate the first delayed clock signal, wherein the first delay value is determined based on a time duration associated with the generation of the plurality of state signals and a time duration associated with the generation of the clock glitch signal and the voltage glitch signal.

3. The glitch detector of claim 2, further comprising a first logic gate that is coupled with the first delay element, and configured to receive the first delayed clock signal and one of a first logic signal and a glitch output signal, and output the first delayed clock signal based on one of the first logic signal and the glitch output signal, wherein the glitch output signal is generated based on the clock glitch signal and the voltage glitch signal.

4. The glitch detector of claim 3, further comprising:
a counter that is configured to receive the clock signal, count a number of cycles of the clock signal, and generate a count signal based on the number of cycles of the clock signal; and
a second logic gate that is coupled with the counter, the pattern comparison circuit, and the first logic gate, and configured to receive the count signal and the glitch output signal, and generate and provide the first logic signal to the first logic gate.

5. The glitch detector of claim 1, wherein the reference storage circuit comprises a first plurality of flip-flops that are coupled with the metastability detector circuit and the pattern comparison circuit, and wherein each flip-flop of the first plurality of flip-flops is configured to receive a corresponding state signal of the plurality of state signals and the first delayed clock signal, store a logic state of the corresponding state signal based on the first delayed clock signal, and generate and provide a corresponding reference signal of the plurality of reference signals to the pattern comparison circuit.

6. The glitch detector of claim 1, wherein the metastability detector circuit comprises:
a plurality of metastability detectors, wherein each state signal of the plurality of state signals indicates a metastable state of a corresponding metastability detector of the plurality of metastability detectors, and wherein each metastability detector of the plurality of metastability detectors comprises:
a second delay element that is configured to receive an input signal and delay the input signal by a second delay value to generate a second delayed clock signal, wherein the input signal is one of the clock signal and an output signal generated by a corresponding delay element of a previous metastability detector of the plurality of metastability detectors, and wherein the second delay value is determined based on a duration of a half cycle of the clock signal;
a third logic gate that is configured to receive the clock signal and generate an inverted clock signal;
a second plurality of flip-flops that include first and second flip-flops, wherein the first flip-flop is coupled with the second delay element and the third logic gate, and configured to receive the second delayed clock signal and the inverted clock signal, and generate a first flop-output signal, and wherein the second flip-flop is coupled with the second delay element, and configured to receive the second delayed clock signal and the clock signal, and generate a second flop-output signal; and
a fourth logic gate that is coupled with the first and second flip-flops, and configured to receive the first and second flop-output signals, and generate a corresponding state signal of the plurality of state signals.

7. The glitch detector of claim 6, wherein the first pattern is indicative of the metastable state of each metastability detector of the plurality of metastability detectors during the current cycle of the clock signal, and the second pattern is indicative of the metastable state of each metastability detector of the plurality of metastability detectors during the previous cycle of the clock signal.

8. The glitch detector of claim 1, wherein the pattern comparison circuit comprises:
a first pattern detector that is coupled with the reference storage circuit, and configured to receive the plurality of reference signals, and generate a first plurality of pattern signals based on the second pattern; and
a second pattern detector that is coupled with the metastability detector circuit, and configured to receive the plurality of state signals generated during the current cycle of the clock signal, and generate a second plurality of pattern signals based on the first pattern.

9. The glitch detector of claim 8, wherein the pattern comparison circuit further comprises:
- a first processing circuit that is coupled with the first pattern detector, and configured to receive the first plurality of pattern signals and the first value, and generate a first processed signal, wherein the first value is a first predetermined value that indicates a frequency range associated with the clock signal;
- a second processing circuit that is coupled with the first and second pattern detectors, and configured to receive a first pattern signal of the first plurality of pattern signals and a second pattern signal of the second plurality of pattern signals, and generate a second processed signal;
- a third processing circuit that is coupled with the first pattern detector, and configured to receive the first plurality of pattern signals and the second value, and generate a third processed signal, wherein the first and third processed signals are generated at least once during a reset cycle of the glitch detector, and wherein the second value is a second predetermined value that indicates a magnitude range associated with the glitch detector;
- a fourth processing circuit that is coupled with the second pattern detector, and configured to receive the second plurality of pattern signals, and generate a fourth processed signal, wherein the second and fourth processed signals are generated at each cycle of the clock signal;
- a first comparator that is coupled with the first and second processing circuits, and configured to receive the first and second processed signals, and compare the first and second processed signals to generate the clock glitch signal, wherein the clock glitch signal is indicative of one of a clock glitch and a gradual change in the frequency associated with the clock signal; and
- a second comparator that is coupled with the third and fourth processing circuits, and configured to receive the third and fourth processed signals, and compare the third and fourth processed signals to generate the voltage glitch signal, wherein the voltage glitch signal is indicative of one of a voltage glitch and a gradual change in the operating voltage associated with the glitch detector.

10. The glitch detector of claim 9, wherein the pattern comparison circuit further comprises a fifth logic gate that is coupled with the first and second comparators, and configured to receive the clock glitch signal and the voltage glitch signal, and generate a glitch output signal, wherein the glitch output signal is independent of process variations associated with the glitch detector.

* * * * *